US012701460B2

(12) United States Patent
Taneja

(10) Patent No.: US 12,701,460 B2
(45) Date of Patent: Aug. 4, 2026

(54) RAN DRIVEN L4S MARKING AND PROCESSING FOR CONGESTION MANAGEMENT IN AN O-RAN BASED NETWORK ARCHITECTURE

(71) Applicant: Mavenir Systems, Inc., Richardson, TX (US)

(72) Inventor: Mukesh Taneja, Bangalore (IN)

(73) Assignee: Mavenir Systems, Inc., Richardson, TX (US)

( * ) Notice: Subject to any disclaimer, the term of this patent is extended or adjusted under 35 U.S.C. 154(b) by 96 days.

(21) Appl. No.: 18/439,964

(22) Filed: Feb. 13, 2024

(65) Prior Publication Data

US 2024/0334243 A1     Oct. 3, 2024

(30) Foreign Application Priority Data

Mar. 30, 2023    (IN) .............................. 202321024079

(51) Int. Cl.
*H04W 28/02*        (2009.01)
*H04L 47/263*       (2022.01)
*H04L 47/30*        (2022.01)

(52) U.S. Cl.
CPC ....... *H04W 28/0284* (2013.01); *H04L 47/263* (2013.01); *H04L 47/30* (2013.01); *H04W 28/0278* (2013.01); *H04W 28/0289* (2013.01)

(58) Field of Classification Search
CPC ......... H04W 28/0284; H04W 28/0289; H04W 28/0278; H04L 47/263; H04L 47/30
See application file for complete search history.

(56) References Cited

U.S. PATENT DOCUMENTS

2016/0227434 A1*   8/2016   Grinshpun ........ H04W 28/0278
2020/0112879 A1*   4/2020   Shimoda .............. H04W 28/06
(Continued)

FOREIGN PATENT DOCUMENTS

GB          2577531         4/2020
WO     WO-2014084767 A1 *  6/2014   ............ H04W 72/54
(Continued)

OTHER PUBLICATIONS

Extended European Search Report for corresponding European application 24163460.9, 7 pages, dated Jul. 12, 2024.
(Continued)

*Primary Examiner* — Patrice L Winder
(74) *Attorney, Agent, or Firm* — Ruggiero McAllister & McMahon LLC

(57)          ABSTRACT

A system and method for reducing bottleneck queues in the Open Radio Access Network (O-RAN) architecture through classification of Packet Data Convergence Protocol (PDCP) and Radio Link Control (RLC) queues at the Centralized Unit-User Plane (CU-UP). The system analyzes and determines a category for the CU-UP PDCP queue for the Data Radio Bearer (DRB), x, at the CU-UP and analyzes and determines a category for the DU RLC queue for the DRB, x, at the CU-UP. If the Congestion Indicator indicates Congestion Experienced (CE) for this DRB in the RAN, the system at the CU-UP starts inserting CE in the IP packet header for packets going in the reverse direction towards the application source, which in turn will modify the rate of transfer based on the number and duration of CE received.

14 Claims, 7 Drawing Sheets

(56) References Cited

U.S. PATENT DOCUMENTS

| | | | | | |
|---|---|---|---|---|---|
| 2021/0029580 A1* | 1/2021 | Gupta | ............... | H04W 28/0278 |
| 2021/0211939 A1* | 7/2021 | Teyeb | ............... | H04W 28/0278 |
| 2022/0159525 A1 | 5/2022 | Chou et al. | | |
| 2022/0311712 A1* | 9/2022 | Kollar | ................... | H04W 24/08 |
| 2022/0408308 A1* | 12/2022 | Wu | ................... | H04W 28/0236 |

FOREIGN PATENT DOCUMENTS

| | | | | |
|---|---|---|---|---|
| WO | 2022005344 | 1/2022 | | |
| WO | WO-2023048628 A1 * | 3/2023 | ........ | H04W 28/0289 |

OTHER PUBLICATIONS

3GPP TS 38.323, v.17.3.0 3rd Generation Partnership Project: Technical Specification Group Radio Access Network; NR; Packet Data Convergence Protocol (PDCP) Specification (Release 17); Dec. 2022.

3GPP TS38.425, v. 17.2.0 3rd Generation Partnership Project: Technical Specification Group Radio Access Network; NG-RAN; NR User Plane Protocol (Release 17); Dec. 2022.

Briscoe et al "RFC 9330:Low Latency, Low Loss, and Scalable Throughput (L4S) Internet Service: Architecture" Internet Engineering Task Force (IETF); Jan. 2023.

De Schepper et al. "RFC 9331: The Explicit Congestion Notification (ECN) Protocol for Low Latency, Low Loss, and Scalable Throughput (L4S)" Internet Engineering Task Force (IETF); Jan. 2023.

K. De Schepper et al.: "RFC 9332: Dual-Queue Coupled Active Queue Management (AQM) for Low Latency, Low Loss, and Scalable Throughput (L4S)" Internet Engineering Task Force (IETF); Jan. 2023.

* cited by examiner

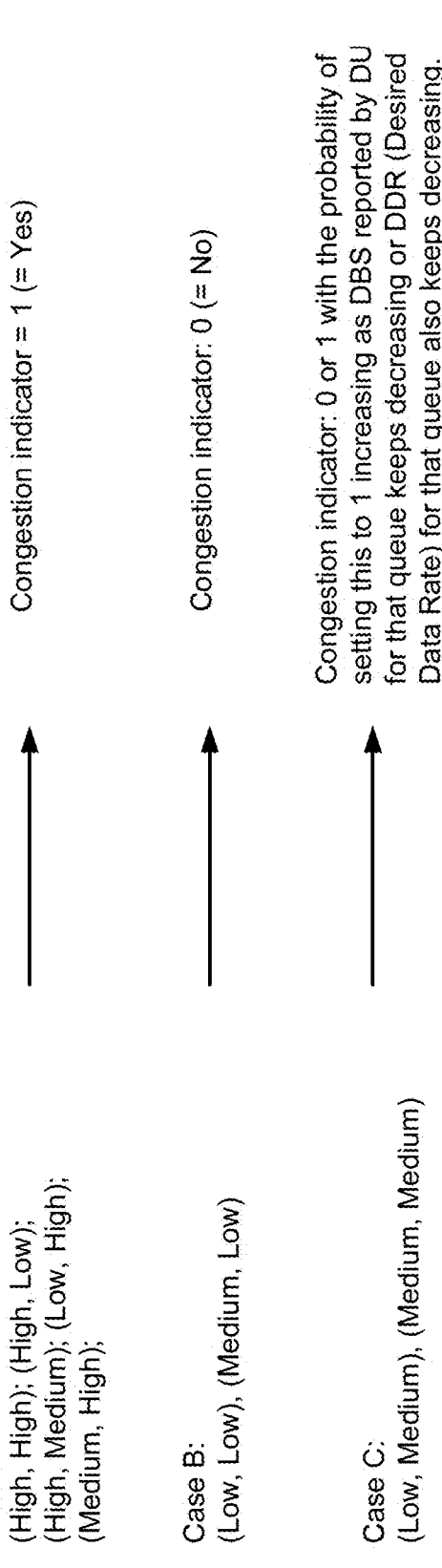

Case A:
(High, High); (High, Low);
(High, Medium); (Low, High);
(Medium, High);

Congestion indicator = 1 (= Yes)

Case B:
(Low, Low), (Medium, Low)

Congestion indicator: 0 (= No)

Case C:
(Low, Medium), (Medium, Medium)

Congestion indicator: 0 or 1 with the probability of setting this to 1 increasing as DBS reported by DU for that queue keeps decreasing or DDR (Desired Data Rate) for that queue also keeps decreasing.

Legend;
(Overall category of PDCP queue for a DRB at CU-UP, Overall category of DU RLC queue for a DRB as derived as derived at CU-UP);
(n1,n2) where n1 and n2 can be High / Medium / Low

FIG. 3

RAN DRIVEN L4S MARKING AND PROCESSING FOR CONGESTION MANAGEMENT IN AN O-RAN BASED NETWORK ARCHITECTURE

CROSS REFERENCE TO RELATED APPLICATIONS

This application claims benefit under 35 USC § 119 of Indian Provisional Application No. 20/232,1024079 filed Mar. 30, 2023, the entire contents of which are incorporated herein by reference.

BACKGROUND

1. Field of the Invention

The present disclosure is related to bottleneck queues in the Open Radio Access Network (O-RAN) architecture. More particularly, the present disclosure is related to reducing or eliminating bottlenecks through classification of Packet Data Convergence Protocol (PDCP) and Radio Link Control (RLC) queues at the Centralized Unit-User Plane (CU-UP) for congestion management in a Radio Access Network (RAN).

2. Description of Related Art

Low queuing Latency, Low Loss, and Scalable throughput (L4S) architecture enables Internet applications to achieve relatively low queuing latency, low congestion loss and scalable throughput control. The main concepts of L4S are provided below.

Explicit Congestion Notification (ECN): ECN uses two bits in the IP header for notification of congestion in the network when a packet is ECN Capable Transport (ECT) enabled. Four different codepoints supported by ECN for L4S are used.

1. Binary codepoint 00, Non-ECT. If a source marks a packet as Non-ECT, this packet does not support ECN and cannot be marked as Congestion Experienced (CE) if congestion occurs at a network node.
2. Binary codepoint 01, ECT(1). This is used for L4S Capable Transport. In this case, a packet is sent in the L4S queue at a network node (and not in the classic queue). Also, the packet supports ECN and can be marked as Congestion Experienced (CE) by network nodes if congestion occurs.
3. Binary codepoint 10, ECT(0), ECN Capable Transport but not L4S Capable. In this case, the packet needs to be sent in the classic queue at a network node and not in the L4S queue.
4. Binary codepoint 11, Congestion Experienced (CE).

The L4S capable network node supports two queues-a Classic queue (for non-L4S packets) and an L4S queue (for L4S packets). Packets with non-ECT and ECT(0) codepoints are sent to the classic queue and other packets with codepoints ECT(1) and CE are sent to the L4S queue. In the L4S architecture, a network node marks packets as CE (Congestion Experienced) in the L4S queue as soon as a queuing delay in that node exceeds a threshold.

For the above, network nodes are required to distinguish L4S traffic from classic traffic for co-existence and incremental deployment. For ensuring low latency, L4S relies on Accurate ECN, which allows the sender to react more finely according to the congestion level, but which requires an adapted transport stack, such as TCP-Prague.

Scalable Congestion Control protocol in end hosts: These methods adapt the rate of the sender node proportionally to the number of congestion signals received. During congestion, these methods decrease the rate of the sender node (in proportion to the number of CE-marked packets received at the receiver) and this decrease is less than what one finds with the Classic congestion control methods (such as with TCP Reno). TCP Prague (used with L4S), DCTCP (Data Center TCP) and SCREAM (Self-Clocked Rate Adaptation for Multimedia) are some examples of protocols supporting scalable congestion control methods.

Active Queue Management (AQM) in bottleneck links: AQM drops packets from a queue before reaching its memory limits and improves performance of end-to-end flows. It can also mark packets instead of dropping them if input traffic is ECN capable. To improve the coexistence of different traffic types, L4S architecture uses DualQ Coupled AQM, which enables the fair sharing of bandwidth of the low-latency (LL) traffic and other best effort (BE) traffics, via a coupling between the two queueing algorithms.

This overall end-to-end procedure works as follows (with the L4S architecture) in the IP networks: 1) The source (or sender) indicates L4S support through the ECN codepoint 01; 2) the Network nodes identify a packet as an L4S packet and change the ECN bits to Congestion Experienced (CE with codepoint 11) when congestion occurs; 3) The receiver checks the ECN bits on receipt of a packet and notifies the source about the congestion if it receives a Congestion Experienced (CE) codepoint in the ECN bits; and 4) The source (or sender) adapts the sending rate as per the Scalable Congestion Control described above.

Open Radio Access Network (O-RAN) is based on disaggregated components which are connected through open and standardized interfaces based on 3GPP NG-RAN. An overview of O-RAN with disaggregated RAN CU (Centralized Unit), DU (Distributed Unit), and RU (Radio Unit), near-real-time Radio Intelligent Controller (RIC) and non-real-time RIC is illustrated in FIG. 1.

As noted with respect to FIG. 1, the CU and the DU are connected using the F1 interface (with F1-C for control plane and F1-U for user plane traffic) over a mid-haul (MH) path. One DU could host multiple cells (e.g., one DU could host 24 cells) and each cell may support many users. For example, one cell may support 600 Radio Resource Control (RRC) Connected users and out of these 600, there may be 200 Active users (i.e., users that have data to send at a given point of time).

A cell site could comprise multiple sectors and each sector may support multiple cells. For example, one site could comprise three sectors and each sector could support eight cells (with eight cells in each sector on different frequency bands). One CU-CP (CU-Control Plane) instance could support multiple DUs and thus multiple cells. For example, a CU-CP instance could support 1,000 cells and around 100,000 User Equipment (UE). Each UE could support multiple Data Radio Bearers (DRB) and there could be multiple instances of CU-UP (CU-User Plane) to serve these DRBs. For example, each UE could support 4 DRBs, and 400,000 DRBs (corresponding to 100,000 UEs) may be served by five CU-UP instances (and one CU-CP instance).

The DU could be in a private data center, or it could be located at a cell-site. The CU could also be in a private data center or even hosted on a public cloud system. The DU and CU are typically located at different physical locations. The CU communicates with a 5G core system, which could also be hosted in the same public cloud system (or could be hosted by a different cloud provider). A RU (Radio Unit) is located at a cell-site and communicates with the DU via a front-haul (FH) interface.

The E2 nodes (CU and DU) are connected to the near-real-time RIC using the E2 interface. The E2 interface is used to send data (e.g., user, cell, slice Key Performance Measures or KPMs) from the RAN, and deploy control actions and policies to the RAN at near-real-time RIC. The application or service at the near-real-time RIC that deploys the control actions and policies to the RAN are called xApps. The near-real-time RIC is connected to the non-real-time RIC using the AI interface.

L4S relies on ECN bits in the IP header and the ability of network nodes to mark these bits as needed by the L4S architecture to manage congestion in the network. While the L4S architecture allows for scalable throughput, there are three types of bottleneck queues in O-RAN architecture, which are described below.

1. Internet Protocol (IP) queues. IP queues at the intermediate routers between the 5G core network and the CU-UP, or between the 5G CU-UP and the 5G DU.
2. Packet Data Convergence Protocol (PDCP) queues. As previously discussed, CU-UP and DU could be located in different data centers and could be physically located apart from each other (e.g. DU in a private data center or at cell site and the CU-UP 100 km away in a public cloud) in the O-RAN's disaggregated architecture. PDCP queue for a DRB at CU-UP stores PDCP SDUs (i.e. incoming IP packets from the 5G core network). Once it has transmitted PDCP PDUs to DU, it also stores these PDUs in a retransmission queue until these are acknowledged by the DU. PDCP queue can build up if buffer occupancy is consistently quite high in the corresponding RLC queue in the DU. PDCP queue can also build up if the packet error rate is quite high over the mid-haul that is being used to connect DU and CU. The L4S architecture doesn't provide visibility for this.
3. Radio Link Control (RLC) queues. RLC queues at the DU (for RLC SDUs/PDUs). The DL (downlink) RLC queue for a DRB at the DU stores RLC SDUs (or PDCP PDUs) that it receives from CU-UP in the downlink direction. The UE corresponding to this DRB (or the corresponding logical channel) could be experiencing poor channel conditions or high interference or cell-load could be quite high in the cell where the UE is located, and such conditions can result in queue build up for the corresponding DRB. The L4S architecture doesn't provide visibility for this.

Current L4S architecture and associated mechanisms take care of congestion management taking into account the first type of queues (i.e. the IP queues at the intermediate routers). It doesn't really have visibility into the PDCP queues at the CU-UP and the RLC queues at the DU and the dynamic behavoir of these queues in the O-RAN architecture as discussed above.

Prior art and limitations. Two approaches have been considered.

Existing Approach I: Mark packets at the PDCP layer.

Limitations of this approach: In 5G O-RAN disaggregated systems, RLC queues are at the DU and PDCP is at CU-UP, and DU and CU-UP could be located many kilometers apart. Marking at PDCP delays congestion signal (to the source of that application) as it marks new incoming packets to the RLC queue, which are at the tail of the RLC queue. This becomes even worse in the O-RAN systems as the mid-haul latency between DU and CU could be on the order of few ms to few 10 s of ms. An effective mechanism is needed to deal with this problem.

Existing Approach II: Perform (RLC) Queuing at the PDCP Layer in the CU-UP.

Limitation of this approach: In the disaggregated O-RAN architecture (for example, with 7.2 split), the MAC scheduler works on the RLC queues, which are in the DU. If RLC queuing is done at PDCP layer in the CU-UP, an effective mechanism is still needed to send enough data to DU every slot to properly utilize air-interface capacity. Slot length could be 1 ms or 0.5 ms or even less but the mid-haul delay (i.e. mid-haul delay between DU and CU-UP) itself could be in 10 s of ms. Thus, this approach is not really feasible for disaggregated O-RAN systems with commonly used mid-haul in the internet.

Accordingly, there is a need for a congestion management system that overcomes, alleviates, and/or mitigates the deleterious effects of prior art particular to O-RAN systems.

SUMMARY

Accordingly, what is desired is a system and method that effectively achieves low queuing latency, low congestion loss and scalable throughput control in a 5G cellular network.

It is further desired to provide a system and method that effectively achieves low queuing latency, low congestion loss and scalable throughput control in disaggregated O-RAN systems.

It is also desired to provide a system and method that has visibility into the dynamic behavior of PDCP queues and RLC queues in O-RAN architecture.

It is yet further desired to provide a system and method that effectively mitigates congestion due to the PDCP queues at the CU-UP in O-RAN architecture.

It is still further desired to provide a system and method that effectively mitigates congestion due to the RLC queues at the DU in O-RAN architecture.

In one configuration, a system is provided that analyzes and determines a category for the CU-UP PDCP queue for the DRB, x, at the CU-UP. The system also analyzes and determines a category for the DU RLC queue for the DRB, y, at the CU-UP. The system will further analyze and derive the value of the Congestion Indicator for this DRB y. The CU-UP keeps track of uplink and downlink GTP-U tunnels over the NG-U interface for that DRB (and the corresponding PDU session). General Packet Radio Service Tunneling Protocol in User Plane (GTP-U) is used over SI-U and X2, interfaces of the 4G System and over NG-U, F1-U and Xn-U interfaces of the 5G NR (New Radio) system. GTP-U tunnels are used to carry encapsulated Transaction Protocol Data Units (T-PDUs) between a given pair of GTP-U tunnel endpoints.

It should be noted that the DRB carries bidirectional traffic though there are separate downlink and uplink GTP-U tunnels between the CU-UP and the User Plane Function (UPF) in the core network. If the Congestion Indicator indicates Congestion Experienced (CE) for this DRB in the RAN, the L4S module at the CU-UP will begin inserting CE in the IP packet header (in the ECN field) for packets going in the reverse direction towards the (edge) application source. This Congestion Experienced (CE) indication eventually reaches the (edge) application server. The L4S module at the CU-UP keeps indicating Congestion Experienced (CE) using the IP ECN field and stops when one of the following happens: 1) CE has been indicated in a number of consecutive uplink packets above a pre-configured threshold; or 2) CE has been indicated for a time interval above a pre-configured threshold; or 3) the Queue category of either the RLC queue or the PDCP queue (or both) has changed and that has resulted in changing the congestion indicator for that DRB from "Congestion Experienced" to "No Congestion".

As the (edge) source of that traffic receives Congestion Experienced (CE) indication from the IP header, it will adapt the rate at which it is sending downlink data towards the UE using its scalable congestion control mechanisms. For example, the source of the traffic can start reducing the data rate at which it sends downlink data towards UE. It can decide the amount (and/or a duration) of this reduction based at least in part on the number of uplink packets received with the Congestion Experienced indication. The source will continue to adapt its data rate to improve the congestion situation.

For O-RAN architectures, the L4S related decision making is distributed between the CU-UP and the RIC. The L4S module at the CU-UP classifies each DU RLC queue and each CU-UP PDCP queue carrying L4S traffic. The near-RT-RIC receives these classifications and other relevant parameters from the CU-UP. The near-RT-RIC analyses these parameters along with the operator policies to decide whether to indicate congestion for each DRB carrying L4S traffic. If the near-RT-RIC decides to indicate Congestion Experienced for a DRB, it indicates this to the CU-UP. The CU-UP then starts indicating Congestion Experienced using the IP header to the edge application server. The application server will then adapt its data rate depending on the value of the congestion indicator (e.g., it starts reducing when CE is indicated and starts increasing when CE no longer indicated).

For this application the following terms and definitions shall apply:

The term "network" as used herein includes both networks and internetworks of all kinds, including the Internet, and is not limited to any particular type of network or inter-network.

The terms "first" and "second" are used to distinguish one element, set, data, object or thing from another, and are not used to designate relative position or arrangement in time.

The terms "coupled", "coupled to", "coupled with", "connected", "connected to", and "connected with" as used herein each mean a relationship between or among two or more devices, apparatus, files, programs, applications, media, components, networks, systems, subsystems, and/or means, constituting any one or more of (a) a connection, whether direct or through one or more other devices, apparatus, files, programs, applications, media, components, networks, systems, subsystems, or means, (b) a communications relationship, whether direct or through one or more other devices, apparatus, files, programs, applications, media, components, networks, systems, subsystems, or means, and/or (c) a functional relationship in which the operation of any one or more devices, apparatus, files, programs, applications, media, components, networks, systems, subsystems, or means depends, in whole or in part, on the operation of any one or more others thereof.

In one configuration, a system for reducing bottleneck queues in the Open Radio Access Network (O-RAN) is provided, the system comprising: a Centralized Unit-User Plane (CU-UP) server, an application source coupled to the CU-UP server (or the associated UPF), and software executing on the CU-UP comprising a congestion indicator that measures data congestion in a Packet Data Convergence Protocol (PDCP) queue of the CU-UP server and in a Radio Link Control (RLC) queue of the DU server. The system is provided such that the congestion indicator analyzes and generates a classification for a Data Radio Bearer (DRB) x in the PDCP queue, and the congestion indicator analyzes and generates a classification for a DRB y in the RLC queue. The system is further provided such that if the congestion indicator classifies DRB x or DRB y as Congestion Experienced (CE), the congestion indicator inserts a CE indication in a packet header for packets transmitted to the application source. Finally, the system is provided such that the application source, upon receiving packets with CE indications, will modify a rate of data transfer to the CU-UP server (and to the UE) based on a number or a duration of CE indications received using scalable congestion control mechanisms.

In another configuration, a method for reducing bottleneck queues in the Open Radio Access Network (O-RAN) having a Centralized Unit-User Plane (CU-UP) server (or the associated UPF) coupled to an application source and software executing on the CU-UP server comprising a congestion indicator is provided. The method comprises the steps of the congestion indicator measuring data congestion in a Packet Data Convergence Protocol (PDCP) queue of said CU-UP server, and the congestion indicator measuring data congestion in a Radio Link Control (RLC) queue of said DU server. The method further comprises the steps of the congestion indicator analyzing the data congestion in the PDCP queue and the RLC queue, the congestion indicator generating a classification for a Data Radio Bearer (DRB) x in the PDCP queue, and the congestion indicator generating a classification for a DRB y in the RLC queue. The method is provided such that if the congestion indicator classifies DRB x or DRB y as Congestion Experienced (CE), the congestion indicator inserts a CE indication in a packet header for packets transmitted to the application source. Finally, the method is provided such that the application source, upon receiving packets with CE indications, modifies a rate of data transfer to the CU-UP server and to the UE) based on a number or a duration of CE indications received using scalable congestion control mechanisms.

The above-described and other features and advantages of the present disclosure will be appreciated and understood by those skilled in the art from the following detailed description, drawings, and appended claims.

DESCRIPTION OF THE DRAWINGS

FIG. 3 is a Computation of a Congestion Indicator at the CU-UP considering a category of RLC and PDCP queues for congestion management according to the system and method of FIG. 2.

DETAILED DESCRIPTION

As discussed above, there are two categories of bottleneck queues in the O-RAN architecture for the downlink packets:

PDCP SDU/PDU queue at CU-UP. This queue stores PDCP SDUs (i.e. incoming IP packets from the core network). Once it has transmitted PDCP PDUs to DU, it also stores these PDUs in a retransmission queue until these are acknowledged by DU. PDCP queue can build up if buffer occupancy is consistently quite high in the corresponding RLC queue in DU. PDCP queue can also build up if the packet error rate is quite high over the mid-haul that is being used to connect DU and CU.

RLC SDU queue at DU. This queue stores PDCP PDUs (or RLC SDUs) of a DRB that it receives from CU-UP in the downlink direction. The UE corresponding to this DRB could be experiencing poor channel conditions or high interference or load could be quite high in that cell, and such conditions can result in queue build up for the corresponding DRB.

Classification of PDCP and RLC Queues for Congestion Management.

Figure 1:
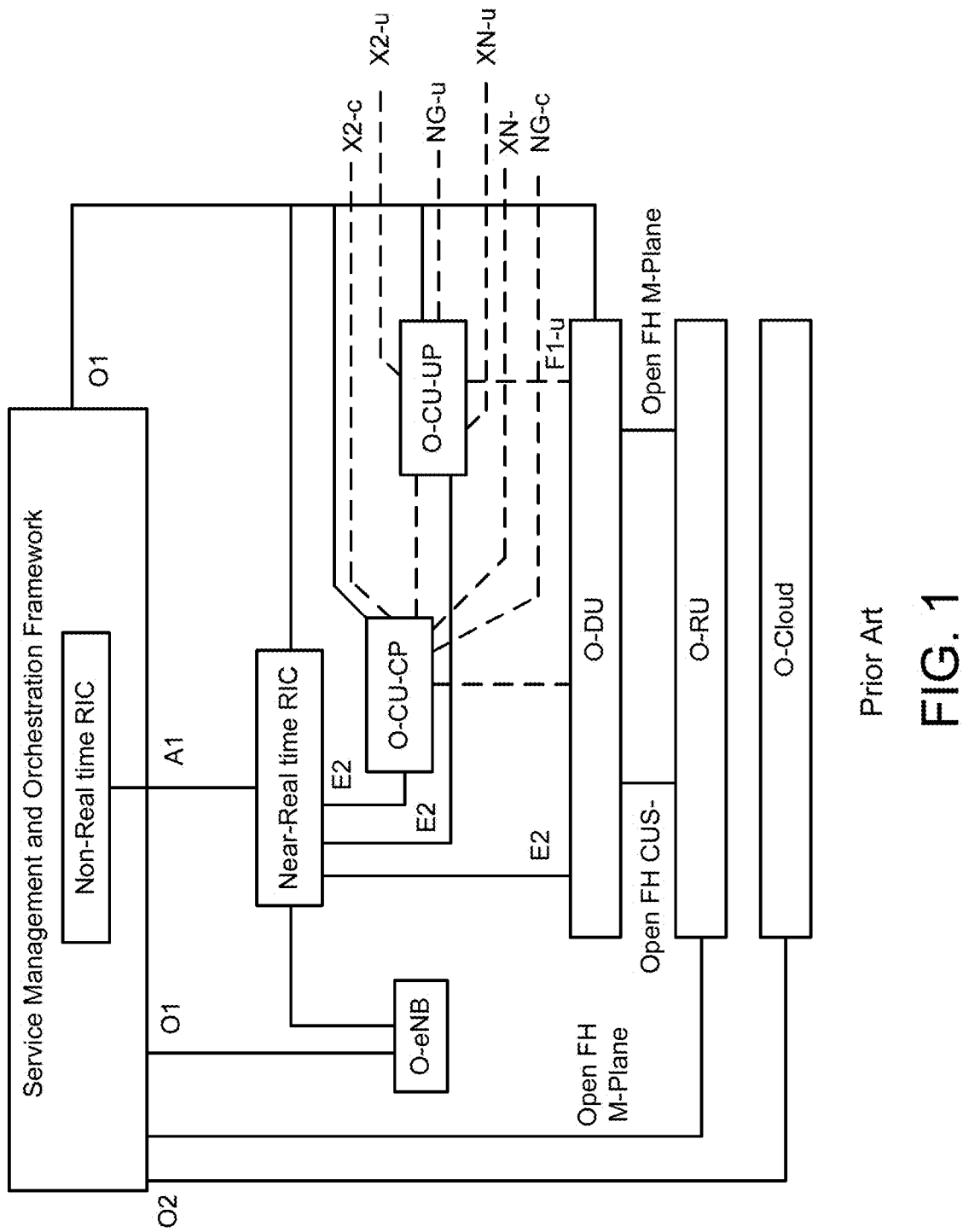
FIG. 1 is a block diagram of typical O-RAN architecture according to the prior art.
Figure 2:
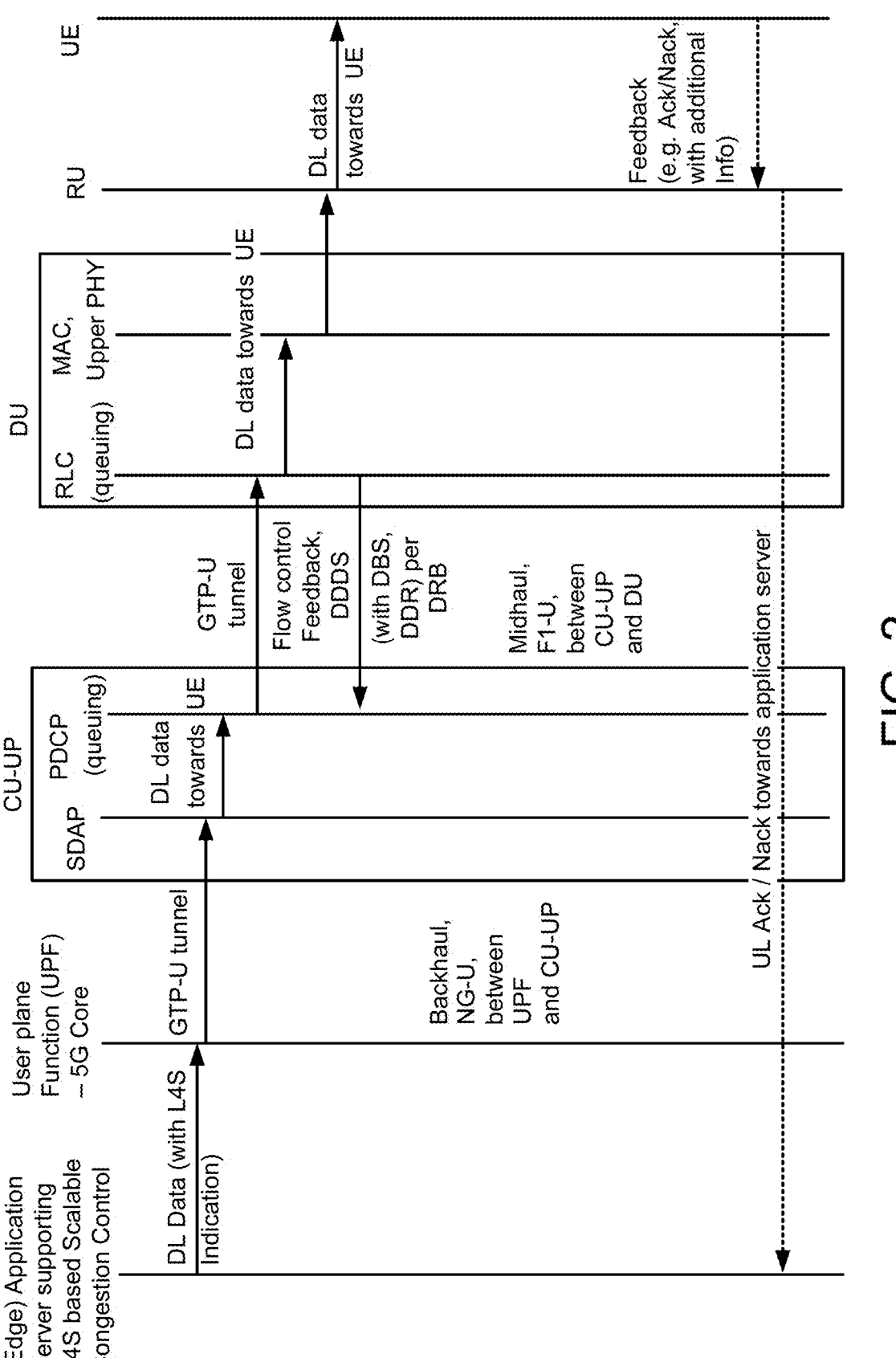
FIG. 2 is a flow diagram according to one configuration of the system and method for reducing bottleneck queues in an O-RAN including an application server supporting L4S based scalable congestion control to UE.

PDCP queues as well as RLC queues are classified in different categories for L4S based congestion management and this classification at CU-UP as can be seen with reference to FIG. 2. It should be noted that Routers/switches 1) between UPF/5G Core and CU-UP, and 2) between CU-UP and DU, are not shown in FIG. 2.

The downlink direction is discussed first. The UPF in 5G core network receives downlink data (i.e., IP packets) from a L4S server with (L4S indicated in the IP header). These downlink IP Packets are transported to SDAP (at CU-UP) via GTP-U tunnel. With respect to processing at CU-UP, these are enqueued in the PDCP SDU queue after processing at SDAP, ciphering, header compression and other operations are carried out in PDCP queue and PDCP PDUs are created, and PDCP PDUs are transmitted from CU-UP to DU.

Continuing the downlink direction description, the NR-U flow control protocol operates between CU-UP and DU, and the PDCP PDUs are received at DU and these are enqueued in the RLC SDU queue at DU. With respect to processing at the DU, the MAC scheduler takes scheduling decisions at the DU for each cell, selects logical channels of different UEs to serve and fetches data from RLC queues to transmit to the corresponding UEs, and the DU sends this downlink data to UE via the RU.

The uplink direction is now discussed. UE indicates status of reception of packets from the DU using the feedback mechanisms that exist between DU and UE. The DU retransmits certain packets (to UE) if UE indicates that these were not correctly received. These packets in the UL direction are processed at Phy, MAC and RLC layers at the DU. The DU transmits UL packets to CU-UP. These are processed at PDCP and SDAP (of CU-UP) and then are sent toward the core network and eventually to the application server.

A. Classification of PDCP Queues at CU-UP for Congestion Management

PDCP queue at CU-UP: This queue stores PDCP SDUs (i.e., incoming IP packets from the core network). These PDCP SDUs go through PDCP sublayer processing and are converted to PDCP PDUs. Once CU-UP has transmitted PDCP PDUs to the DU, it also stores these PDUs in a retransmission queue at the CU-UP until these are acknowledged by the DU.

PDCP queue (for a DRB) can build up if buffer occupancy is consistently high in the corresponding RLC queue in the DU and that can slow down the rate at which the CU-UP can send data from that PDCP queue to the corresponding RLC queue at the DU. The PDCP queue can also build up if the Packet Error Rate (PER) is high over the mid-haul that is being used to connect the DU and the CU. A high PER over the mid-haul can increase the number of PDCP PDUs that must be stored in the retransmission queues at the CU-UP.

I. Classification Type I (for PDCP Queues)

Occupancy level of PDCP queue is defined at the CU-UP (at time t) for a DRB as follows.

The occupancy of the PDCP queue at the CU-UP for a DRB is High if the occupancy of PDCP queue stays above a threshold, pdcp_high_threshold, for a minimum time interval, time_high_pdcp_threshold.

The occupancy of the PDCP queue at the CU-UP for a DRB is Low if occupancy level of this PDCP queue stays below a threshold, pdcp_low_threshold, for a minimum time interval, time_low_pdcp_threshold.

This occupancy is classified as Medium if it doesn't fall in any of the above categories.

II. Classification Type II (for PDCP Queues)

The waiting times are considered of PDCP packets in the PDCP queue at the CU-UP and different categories of these queues are defined to aid congestion management in O-RAN based L4S networks.

Given an end-to-end delay target for a DRB, a delay target is allocated for processing PDCP packets in the CU-UP. In one example, 5QI (5G QOS Identifier) is used to standardized QoS characteristics mapping from 3GPP TS 23.501. An example for 5QI 9 is now discussed. For 5QI 9, packet delay budget (PDB) is specified as 300 ms. Depending on the delay characteristics of different parts of the network such as mid-haul delay (i.e., between the DU and the CU-UP), backhaul delay (i.e., between the CU-UP and the User Plane Function in the 5G core network), the RLC queueing delay in the DU and other delay components in a specific network deployment, a delay target is assigned for processing of a packet in the CU-UP to be 10 ms. Note this also includes the queuing delay at the CU-UP. In this example, 10 ms becomes the target delay in the CU-UP for DRB carrying 5QI 9 packets.

As the CU-UP transmits a PDCP PDU to the DU from the PDCP queue, a difference between the actual time for which that PDCP PDU waited in the PDCP queue and the corresponding delay target in the CU-UP for PDCP packets from that DRB is computed. At time t, this difference is added in waiting and target delay for the last y PDCP PDUs for that DRB and divide this aggregate difference in delay by y to compute an average difference in delay. Here, the value of y can be configured, or its value can be changed dynamically. If it is determined that this average difference in delay is above a threshold, pdcp_waiting_high_threshold, the delay deficit of this PDCP queue is set as High.

If it is below a threshold, pdcp_waiting_low_threshold, the delay deficit of this PDCP queue is set as Low.

Otherwise, the delay deficit of this PDCP queue is classified in the Medium category.

III. Classification Type III (for PDCP Queues)

Combining the above two approaches and defining an overall queue Category of PDCP queues for congestion management purposes for L4S traffic is shown below. Table 1 defines an overall category of PDCP queues for congestion management purposes.

TABLE 1

| Delay deficit of PDCP queue (from Classification Type II) | Occupancy level of PDCP queue (from Classification Type I) | Overall category of PDCP queue (for congestion management purposes) |
|---|---|---|
| High | High | High |
| High | Medium or Low | Medium |
| Medium | High | High |
| Medium | Medium | Medium |
| Medium | Low | Low |
| Low | High | Medium |
| Low | Medium, Low | Low |

B. Classification of DU RLC Queues for Congestion Management

Each DU RLC queue is classified in the High, Medium or Low category but this classification is performed at the CU-UP. The DU sends DDDS (DL Data Delivery Status), which includes Desired Buffer Size (DBS) to the CU-UP as part of the flow control mechanism described in 3GPP TS 38.425. In this method, the L4S module at the CU-UP continuously monitors DBS (Desired Buffer Size) values received as part of DDDS (DL Data Delivery Status) message from DU for this DRB.

If the DU communicates DBS below a threshold, low_dbs_threshold, for a DRB (queue) for a time interval above a threshold, time_low_dbs_threshold, (or for d1 out of previous d2 DDDS messages), the corresponding RLC queue is classified in the High category from the point of view of the congestion management mechanism.

If the DU communicates DBS above a threshold, high_dbs_threshold, for a DRB (queue) for a time interval above a threshold, time_high_dbs_threshold, (or for d3 out of previous d4 DDDS messages) the corresponding RLC queue is classified in the Low category from the point of view of the congestion management mechanism.

Otherwise, RLC queue is classified in the Medium category.

The DU also optionally includes Desired Data Rate (DDR) in the DDDS message that it sends to the CU-UP. If the DDR is also included, that is used along with the DBS to classify each RLC queue in different classes. Table 2 shows a category of RLC queues (for different L4S DRBs) derived at the CU-UP using DBS and DDR from flow control feedback (DDDS from DU to CU-UP).

cator for a DRB, categories of PDCP and RLC queues are processed as indicated in FIG. 3.

For Case A: If (Overall category of the PDCP queue for a DRB at the CU-UP, Overall category of the DU RLC queue for a DRB as derived at the CU-UP) is equal to one of these: (High, High); (High, Low); (High, Medium); (Low, High); (Medium, High); the following occurs: the Congestion indicator is set to "yes" by the L4S module for L4S aware traffic at the CU-UP. Indication of congestion to the source of the traffic for that UE (if needed): CU-UP communicates occurrence of congestion to the source of the traffic.

For Case B: (Overall category of the CU-UP PDCP queue for a DRB at the CU-UP, Overall category of the DU RLC queue for a DRB as derived at the CU-UP) is equal to one of these: (Low, Low), (Medium, Low). Indication of congestion to the source of that UE (if needed): No congestion indicated.

For Case C: (Overall category of the CU-UP PDCP queue for a DRB at the CU-UP, Overall category of the DU RLC queue for a DRB as derived at the CU-UP) is equal to one of these: (Low, Medium), (Medium, Medium). Congestion indicator: L4S module sets the congestion indicator to 0 or 1 with the probability of setting this to 1 increasing as the DBS (Desired Buffer Size) reported by DU for that queue keeps decreasing or the DDR (Desired Data Rate) for that queue also keeps decreasing. Indication of congestion to the source of the traffic for that UE (if needed): To indicate congestion to the source of that UE if the RAN reports occurrence of congestion (as derived for the DU RLC queues and the CU-UP PDCP queues at CU-UP); No congestion indicated otherwise.

TABLE 2

| Classification of DU RLC queue for congestion management as described in the text above | Desired Data Rate (DDR) value as provided in the DDDS message (from DU to CU-UP) | Category of RLC queue for the corresponding DRB computed at CU-UP |
|---|---|---|
| High (i.e. RLC at DU conveys Low Desired Buffer Space to CU-UP for the corresponding PDCP queue for this DRB)) | Low or Medium DDR value | High |
| | High DDR value | Medium |
| Low (i.e. RLC at DU conveys High Desired Buffer Space to CU-UP for the corresponding PDCP queue for this DRB) | High or medium or low DDR value | Low |
| Medium | High DDR value | Low |
| Medium | Low or Medium DDR value | Medium |

C. L4S Marking and Processing for Congestion Management in the O-RAN Architecture.

Figure 4:
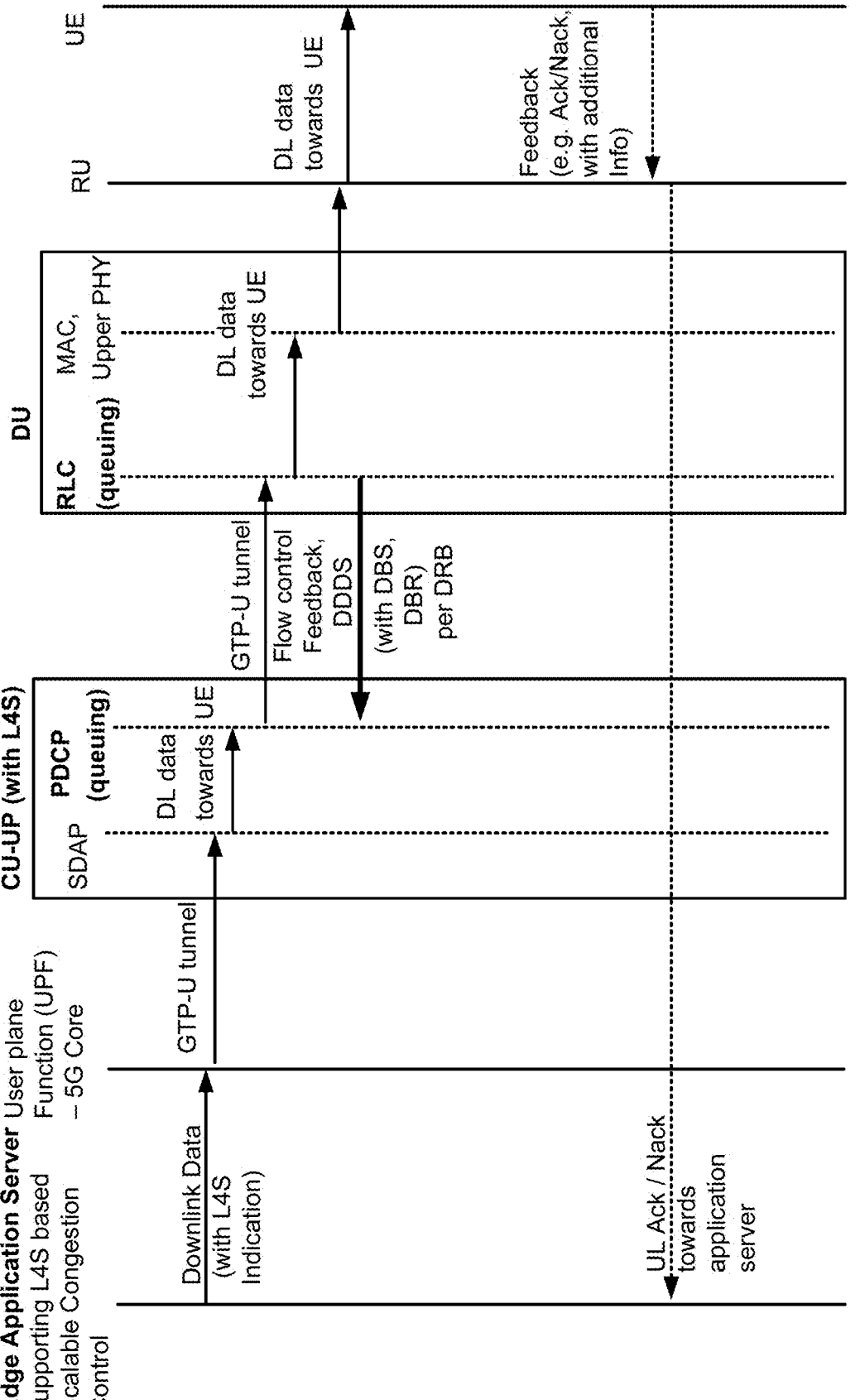
FIG. 4 is an analysis of DU RLC and CU-UP PDCP queues for a DRB at the CU-UP and derivation of RAN congestion indicator for that DRB according to the system and method of FIG. 2.

Here, it is decided in RAN whether to indicate occurrence of congestion to the source of the traffic for the UE (carrying L4S traffic). To decide whether to set the Congestion Indi- Referring now to FIG. 4, the L4S module at the CU-UP analyzes the following for each DRB "x" carrying L4S traffic:

1) Analyze and decide category for each DU RLC queue, q_rlc_drb(x), for DRB x, at the CU-UP by analyzing (DBS, DDR, etc.) provided as part of flow control feedback from the DU to the CU-UP for that DRB.

2) Analyze and decide category for each CU-UP PDCP queue, q_pdcp_drb(x), for DRB x, at the CU-UP.

3) Analyze and derive value of the Congestion Indicator for this DRB x by analyzing category of PDCP and RLC queues for each DRB that is carrying L4S traffic.

4) The CU-UP keeps track of uplink and downlink GTP-U tunnels over the NG-U interface for that DRB (and the corresponding PDU session). Note that DRB carries bidirectional traffic though there are separate downlink and uplink GTP-U tunnels between the CU-UP and the UPF (which is part of the core network). The system will derive value of the RAN congestion indicator as shown at CU-UP in FIG. 5. If the Congestion Indicator indicates Congestion Experienced (CE) for this DRB in the RAN (e.g., congestion indicator=1), the L4S module at the CU-UP starts inserting CE in the IP packet header (in the ECN field) for packets going in the reverse (i.e., uplink for the example in FIG. 5) direction towards the (edge) application source. This Congestion Experienced (CE) indication eventually reaches the (edge) application server as in FIG. 5.

Figure 5:
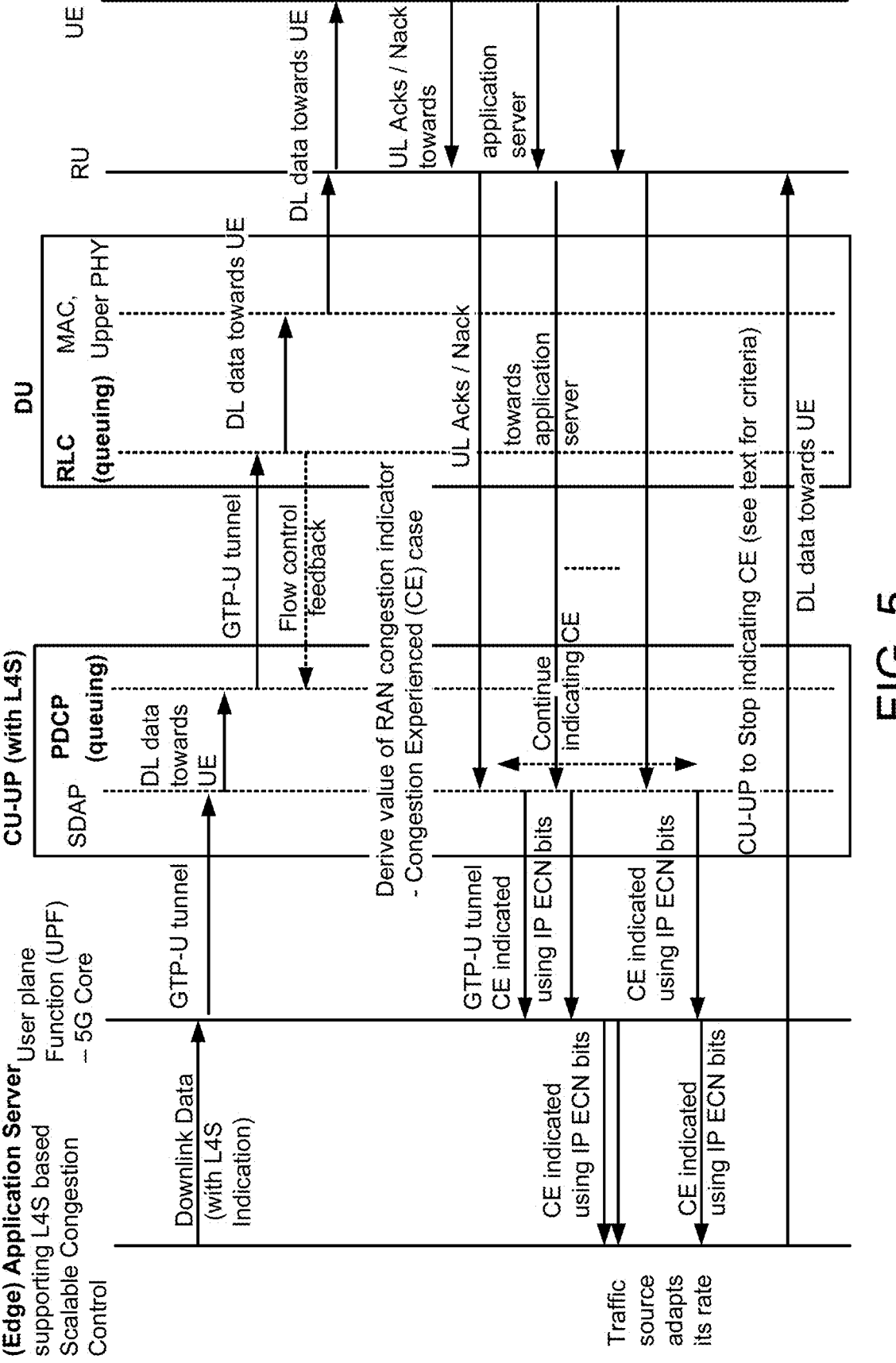
FIG. 5 is a communication of CE indication from CU-UP to an (edge) application server according to the system and method of FIG. 2.

5) The L4S module at the CU-UP will continue to indicate Congestion Experienced (CE) using the IP ECN field (as shown in FIG. 5 from UE to CU-UP; and CE indicated from CU-UP to 5G core to L4S application server). The L4S module will stop providing the CE indication when one of the following happens:

It has indicated CE in number of consecutive uplink packets above a pre-configured threshold; or it has indicated CE for a time interval above a pre-configured threshold; or the Queue category of either the RLC queue or the PDCP queue (or both) has changed and if that has resulted in changing the congestion indicator for that DRB from "Congestion Experienced" to "No Congestion".

6) As the (edge) source of that traffic received the CE indication from the IP header, it adapts the rate at which it sends downlink data towards the UE using scalable congestion control mechanisms. For example, it can reduce the data rate at which it sends downlink data towards UE, and it can decide an amount (and/or duration) of this drop considering the number of uplink packets received with CE indication. When it ceases receiving packets marked with CE and as it keeps getting uplink feedback (i.e., Ack/Nack/Selective Ack etc.), it continues to adapt its data rate up or down as the congestion situation improves or deteriorates.

D. L4S Marking and Processing with Assistance from the RIC for Congestion Management in the O-RAN Architectures.

Figure 6:
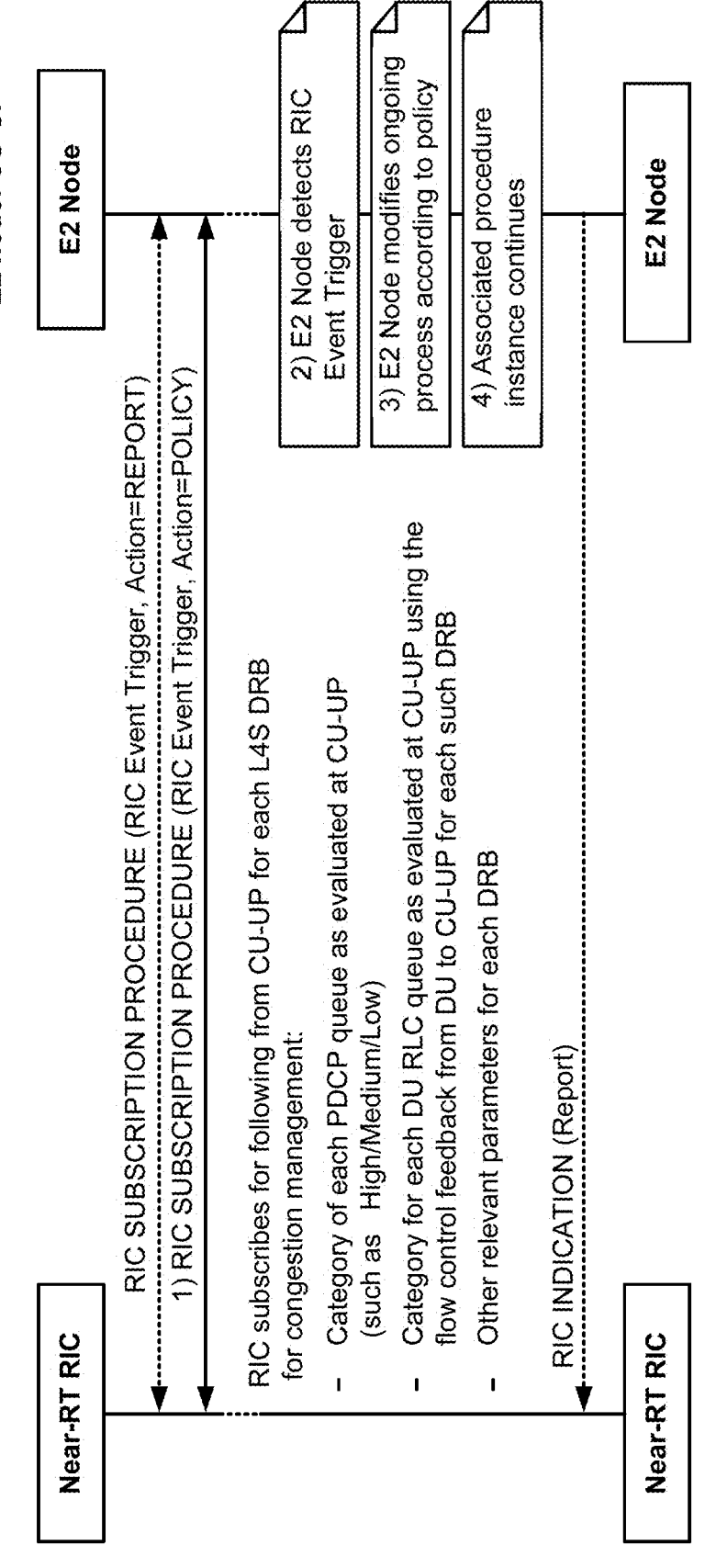
FIG. 6 illustrates Near-Real Time (RT)-RIC subscribing to RLC/PDCP queue categories and other parameters from CU-UP for each DRB carrying L4S traffic according to the system and method of FIG. 2.
Figure 7:
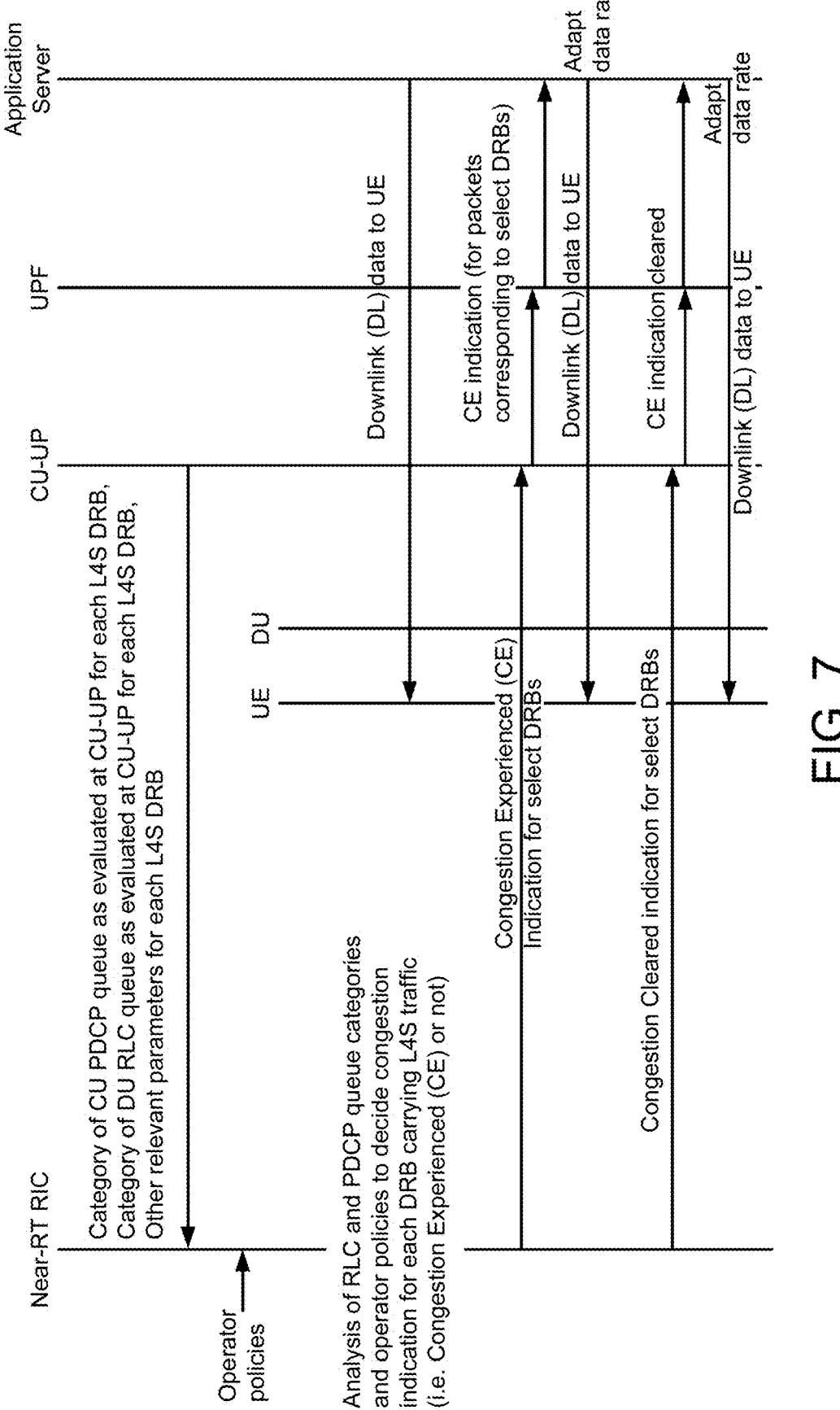
FIG. 7 is a congestion management in O-RAN architecture with assistance from near-RT-RIC according to the system and method of FIG. 2.

Referring now to FIGS. 6 & 7, the above-described method is discussed where the L4S related decision making is distributed between the CU-UP and the RIC. With additional processing at the RIC, it allows the operator to specify their own policies along with the methods described above. The L4S module at the CU-UP classifies each DU RLC queue and each CU-UP PDCP queue carrying L4S traffic as in the previous method. The near-RT-RIC gets these and other relevant parameters from the CU-UP. It analyses these parameters along with the operator policies to decide whether to indicate congestion for each DRB carrying L4S traffic. This method is illustrated in FIGS. 6 & 7. If the near-RT-RIC decides to indicate CE for a DRB, it indicates this to the CU-UP. As in the previous method, the CU-UP begins indicating CE using the IP header to the edge application server. The application server adapts its data rate depending on the value of this congestion indicator (e.g., starts reducing when CE is indicated and starts increasing when CE no longer indicated).

E. Hybrid Approach for Higher Scalability at the CU-UP

In one of the methods above, Sections A, B and C as described above are used for congestion management for each DRB carrying L4S traffic: to classify the CU-UP PDCP queues at the CU-UP for congestion management as in Section A above; classify the DU RLC queues at the CU-UP for congestion management as in Section B above; and analyze the category of RLC and PDCP queues at the CU-UP to decide whether or not to indicate CE for each L4S DRB (with this decision taken at the CU-UP), to communicate CE to the edge application server, and to perform data rate adaptation at the application server as in Section C above.

In still another method, we use Sections A, B and D as described above. The near-RT-RIC analyzes various measures and operator policies to decide whether to indicate CE for certain DRBs. In the hybrid approach, "A, B and C" are used for a subset of DRBs and "A, B and D" for remaining DRBs carrying L4S traffic. This is helpful for following scenarios:

When the CU-UP needs to support a large number of DRBs and it is not possible for it to do L4S related processing as above at the CU-UP only. In this case, the L4S processing for some DRBs is offloaded to the near-RT-RIC.

When an operator may want to apply its policies to certain types of DRBs only. For example, it may want to apply its policies for congestion management only to the DRBs that are carrying DRBs with 5QI9 (e.g., for video streaming). In that case, Methods "A, B and D" can be applied for DRBs carrying 5QI9 traffic while Methods "A, B and C" can be applied for all other DRBs.

While the present disclosure has been described with reference to one or more exemplary embodiments, it will be understood by those skilled in the art that various changes may be made and equivalents may be substituted for elements thereof without departing from the scope of the present disclosure. In addition, many modifications may be made to adapt a particular situation or material to the teachings of the disclosure without departing from the scope thereof. Therefore, it is intended that the present disclosure not be limited to the particular embodiment(s) disclosed as the best mode contemplated, but that the disclosure will include all embodiments falling within the scope of the appended claims.

What is claimed is:

1. A system for reducing bottleneck queues in the Open Radio Access Network (O-RAN) comprising:

a Centralized Unit-User Plane (CU-UP) server;

an application source coupled to said CU-UP server;

a Distributed Server (DU) coupled to said CU-UP server;

a UE coupled to said DU server;

software executing on said CU-UP comprising a Low queuing Latency, Low Loss, and Scalable throughput (L4S) module that measures occupancy level and average delay in a Packet Data Convergence Protocol (PDCP) queue of said CU-UP server and analyzes a Desired Buffer Size (DBS) and a Desired Data Rate (DDR) received from a Radio Link Control (RLC) queue of said DU server for Downlink (DL) L4S data traffic;

software executing on said DU server that computes DBS and DDR for each L4S Data Radio Bearer (DRB) for DL traffic at the DU using a) radio condition of the UE, b) packet error rate of the UE and the DRB, c) Quality of Service (QoS) requirements of the DRB, and d) cell load and amount of buffer available for the DRB in the RLC queue at the DU server;

the software executing on said DU server communicates DBS and DDR for each L4S DRB to said CU-UP server;

said L4S module at said CU-UP server marks DL packets of a DRB x in the PDCP queue as Congestion Experienced (CE) in a packet header based on occupancy level and average delay of packets in the PDCP queue, and DBS and DDR received from the DU for DRB x;

said L4S module at CU-UP server identifies Uplink (UL) packets of the DRB x sent towards the source of the DL traffic for DRB x and marks the packet header of the identified UL packets as CE, if the L4S module at CU-UP server has marked DL packets for DRB x as CE;

wherein said application source, upon receiving UL packets with CE indications from said Cu-UP server, modifies a rate of data transfer to the CU-UP server based on a number or a duration of CE indications received using scalable congestion control mechanisms;

wherein said L4S module continues indicating CE until:

CE has been indicated in a number of consecutive uplink packets until a number threshold is reached;

CE has been continuously indicated for a time interval until a time threshold is reached; or the occupancy measurement of the PDCP queue drops below a threshold level or the communicated DBS value from said DU server rises above a threshold level, or both, which results in the L4S module indicating NC for DRB x.

2. The system according to claim 1, wherein said CU-UP monitors UL and DL GTP-U tunnels over a Next Generation User Plane (NG-U) interface for the DRB x and a corresponding Protocol Data Unit (PDU) session respectively, and wherein said L4S module identifies UL packets of the DRB x being sent to the source of the DL traffic for DRB x and marks these as CE if the L4S module at CU-UP server has marked DL packets for DRB x as CE, wherein said L4S module marks DL packets and UL packets in equivalent proportions in a given time interval.

3. The system according to claim 2, wherein when said application source receives a CE indication, said application source reduces a data rate at which it sends DL, data towards the UE.

4. The system according to claim 3, wherein the data rate reduction is based, at least in part, on a number of CE indications received in uplink packets.

5. The system according to claim 1, further comprising:

a Radio Unit near-real-time Radio Intelligent Controller (near-RT-RIC) coupled to said CU-UP server;

said near-RT-RIC receives the classification for the DRB x and analyzes the classification in conjunction with operator policies to determine whether to indicate CE for each DRB carrying L4S traffic.

6. The system according to claim 5, wherein if said near-RT-RIC indicates CE, the CE determination is transmitted to said CU-UP server.

7. The system according to claim 6, wherein when said CU-UP server receives a CE determination from said near-RT-RIC, said CU-UP server inserts the CE indications in the packet header for packets transmitted to said application source.

8. A method for reducing bottleneck queues in the Open Radio Access Network (O-RAN) having a Centralized Unit-User Plane (CU-UP) server coupled to an application source, a Distributed Server (DU) coupled to said CU-UP server, a UE coupled to said DU server and software executing on the CU-UP server comprising a Low queuing Latency, Low Loss, and Scalable throughput (L4S) module, the method comprising the steps of:

the L4S module measuring an occupancy level and average delay in a Packet Data Convergence Protocol (PDCP) queue of said CU-UP server;

the L4S module analyzing a Desired Buffer Size (DBS) and a Desired Data Rate (DDR) received from a Radio Link Control (RLC) queue of the DU server for Downlink (DL) L4S data traffic;

the DU server computing DBS and DDR for each L4S Data Radio Bearer (DRB) for DL traffic at the DU using a) radio condition of the UE, b) packet error rate of the UE and the DRB, c) Quality of Service (QoS) requirements of the DRB, and d) cell load and amount of buffer available for that DRB in the RLC queue at the DU server;

the DU server transmitting DBS and DDR for each L4S DRB to the CU-UP server, the L4S module marking DL packets of a DRB x in the PDCP queue as Congestion Experienced (CE) in a packet header based on occupancy level and average delay of packets in the PDCP queue, and DBS and DDR received from the DU for DRB x;

the L4S module identifying Uplink (UL) packets of the DRB x sent towards the source of the DL traffic for DRB x and marks the packet header of the identified UL packets as CE, if the L4S module at CU-UP server has marked DL packets for DRB x as CE;

the application source, upon receiving UL packets with CE indications from the CU-UP server, modifying a rate of data transfer to the CU-UP server based on a number or a duration of CE indications received using scalable congestion control mechanisms;

wherein the L4S module continues indicating CE until:

CE has been indicated in a number of consecutive UL packets until a number threshold is reached;

CE has been continuously indicated for a time interval until a time threshold is reached; or the occupancy measurement of the PDCP queue drops below a threshold level or the communicated DBS value from the DU server rises above a threshold level, or both, which results in the L4S module indicating NC for DRB x.

9. The method according to claim 8, further comprising the step of:

the CU-UP server monitors uplink and downlink GTP-U tunnels over a Next Generation User Plane (NG-U) interface for the DRB x and a corresponding Protocol Data Unit (PDU) session respectively, the L4S module identifies UL packets of the DRB x being sent to the source of the DL traffic for DRB x and marks these as CB if the L4S module at the CU-UP server has marked DL packets for DRB x as CE, and the L4S module marks DL packets and UL packets in equivalent proportions in a given time interval.

10. The method according to claim 9, wherein when the application source receives CE indications, the method further comprising the step of:

the application source reduces a data rate at which it sends DL data towards the UE.

11. The method according to claim 10, wherein the data rate reduction is based at least in part on the number of indications received in uplink packets.

12. The method according to claim 8, wherein a Radio Unit near-real-time Radio Intelligent Controller (near-RT-RIC) is coupled to the CU-UP server, the method further comprising the step of:

the near-RT-RIC receiving the classification for the DRB x and analyzing the classification in conjunction with operator policies to determine whether to indicate CE for each DRB carrying L4S traffic.

13. The method according to claim 12, further comprising the step of:

when the near-RT-RIC indicates CE, the CE determination from said near-RT-RIC is transmitted to the CU-UP server.

14. The method according to claim 13, further comprising the step of:

when the CU-UP server receives the CE determination, the CU-UP server then inserts the CE indications in the packet header for packets transmitted to the application source.

* * * * *